UNITED STATES PATENT OFFICE.

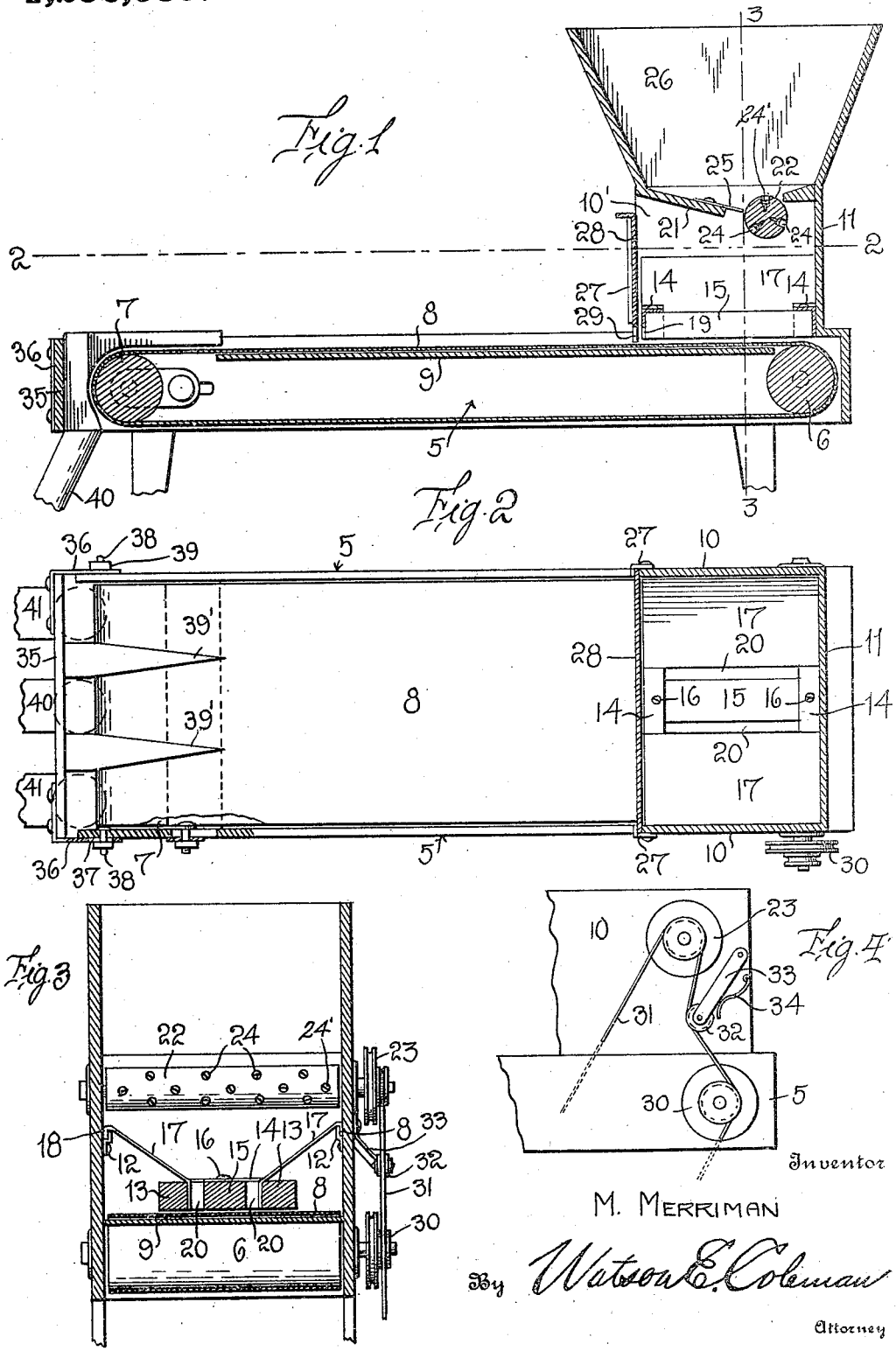

MERTON MERRIMAN, OF LINCOLN, WISCONSIN.

BEAN-SEPARATOR.

1,256,585.

Specification of Letters Patent.  Patented Feb. 19, 1918.

Application filed May 19, 1917. Serial No. 169,734.

*To all whom it may concern:*

Be it known that I, MERTON MERRIMAN, a citizen of the United States, residing at Lincoln, in the county of Adams and State of Wisconsin, have invented certain new and useful Improvements in Bean-Separators, of which the following is a specification, reference being had to the accompanying drawings.

This invention relates to bean separators, and has for its primary object to provide a machine whereby the separation of bad beans and other waste material from the good beans may be greatly facilitated.

It is another important object of the invention to provide a machine for the above purpose, including an endless traveling belt or conveyer, and means for feeding the beans in varying quantities over a greater or less area of the upper stretch of the conveyer.

It is also one of the detailed objects of the invention to provide an improved mounting and arrangement of the feeding roll, and simple and effective means for preventing clogging of said roll.

The invention also has for a further object to provide separate discharge spouts or tubes for the good and bad beans and means for directing the same into the respective tubes, and means for adjustably mounting said tubes and the directing means.

And it is a further general object of my invention to provide a bean sorting or separating machine which is inexpensive in construction, as well as strong and durable, and highly convenient and serviceable in practical use.

With the above and other objects in view, my invention consists in the novel features of construction, combination, and arrangement of parts to be hereinafter more fully described, claimed, and illustrated in the accompanying drawings, in which, Figure 1 is a longitudinal sectional view through a bean sorting machine, illustrating the preferred embodiment of the invention;

Fig. 2 is a horizontal sectional view taken on the line 2—2 of Fig. 1;

Fig. 3 is a transverse section taken on the line 3—3 of Fig. 1;

Fig. 4 is a fragmentary elevation showing the operating means for the feeding roll and the conveyer.

Referring in detail to the drawing, 5 designates the parallel, longitudinal frame bars which are mounted upon a suitable support, and in the opposite ends of these frame bars, the rollers 6 and 7 respectively are rotatably mounted in suitable bearings. An endless apron or conveyer 8 extends around these rollers and the stretches thereof are movable longitudinally between the frame bars 5. The bearings for the rollers 7 are longitudinally adjustable upon the frame bars 5 so that slack in the apron or conveyer 8 may be taken up. Immediately beneath the upper stretch of the apron 8, a horizontal board or wall 9 is arranged and fixed to the frame bars 5. This horizontal board over which the upper stretch of the apron travels, is spaced at its opposite ends from the rollers 6 and 7.

Upon the frame bars 5, above the apron roller 6, the relatively short, vertical walls 10 are arranged, and may be either permanently secured to the frame walls 5 or detachably mounted thereon in any preferred manner. These walls are connected to each other at one of their ends by the transverse wall 11.

To the inner faces of the walls 10, above and in spaced relation to the apron or conveyer, the flanged metal strips 12 are secured. The spaced, longitudinally disposed bars 13 are connected at their ends by the angular metal plates 14, and between these bars 13 and in spaced relation thereto, a central longitudinal bar 15 is disposed beneath the horizontal flanges of the plates 14 and detachably secured to said flanges by means of the screws 16. To the inner face of each of the bars 13, the inner edge of a transversely inclined, directing plate 17 is secured. The outer edges of these plates are downwardly flanged, as shown at 18, and said flanges are adapted to be engaged between the flanged metal strips 12 and the walls 10. When the plates 17 are in position, the bars 13 and 15 are supported with their lower faces slightly above the upper stretch of the apron 8 and the vertical flanges on the plates 14 are notched or recessed, as at 19, in coinciding relation with the space 20 between the inner edges of the plates 17 and the side faces of the central bar 15.

Between the walls 10, adjacent their upper edges, the inclined wall 21 is secured, the lower edge of said wall being disposed contiguous to the periphery of the feed roller 22, the shaft or axis of this roller being rotatably mounted in the walls 10. A double belt pulley 23 is fixed upon one end of the roller shaft, the belt receiving grooves being of relatively different diameters. The periphery of the roller 22 has spaced pockets 24 formed therein, and a stiff fiber brush 25 is secured upon the upper surface of the wall 21 and engaged upon the periphery of the roller to prevent the clogging or wedging of the beans between the edge of the wall 21 and said roller. A suitable hopper, indicated at 26, is mounted upon the walls 10, and from this hopper the beans are continuously fed to the roller. A screw 24' is threaded into the base wall of each of the pockets 24 in the feed roller, and by adjusting these screws, it will be readily understood that the pockets will be of greater or less capacity so as to receive varying quantities of seed.

Upon the inner vertical edges of the walls 10, suitable guides 27 are secured to receive the edges of a removable plate 28, the lower edge of which is centrally cut away or recessed, as at 29. This plate prevents the beans from moving longitudinally off of the ends of the directing plates 17 and upon the conveyer or apron 8.

The shaft of the roller 6 is also provided upon one end with a double belt pulley 30 and a driving belt 31 is engaged in the corresponding grooves of the wheels 22 and 31, and may be operated from any suitable source of power, such for instance, as a pedal actuated shaft mounted in the supporting frame for the bars 5. It will be understood that by shifting this belt, the feed roller and the apron may be operated at the desired speed. A belt tensioning roller 32 is mounted in one end of an arm 33 which is pivoted upon one of the walls 10 and is yieldingly held in engagement with one stretch of the belt 31 by means of the spring indicated at 34.

A bar 35 is provided upon one of its ends with the angular plates 36, these plates having one of their ends disposed upon the outer faces of the bars 5 and provided with longitudinal slots 37 therein through which bolts 38, fixed in the bars 5, extend. Suitable clamping nuts 39 are threaded upon these bolts to clamp the plates 36 against shifting movement. Spaced fingers 39' are fixed upon the bar 35 and project longitudinally over the upper stretch of the apron 8. To the lower edge of the bar 35 and between the fingers 39, a discharge spout 40 for the good beans is secured, and similar spouts 41 for the bad beans are also secured to the opposite ends of said bar. By adjustably mounting the separating fingers and the discharge spouts in the manner above described, it will be readily understood that when the apron roller 6 is adjusted between the frame bars 5, the bar 35 is adjusted accordingly so that the good and bad beans will be properly received into the respective tubes and discharged from the machine.

In the operation of the machine, when there is a large quantity of bad beans and waste material mixed with the good beans, the bars 13 and 15 and the plates 17 are arranged in position between the side walls 10. The beans will thus be delivered from the hopper by the feed roller upon the inclined plates 17 and be directed by said plates downwardly between the spaced bars 13 and 15 and upon the upper stretch of the apron 8 in two parallel rows. The operator can thus more readily separate the worthless material from the goods beans and direct the same to the opposite edges of the apron, without scattering the good beans over the apron surface. The fingers 39 will, therefore, project the good beans into the central receiving tube 40 and the bad beans into the tubes 41 as they are discharged over the end of the traveling apron. When there is a less amount of waste material, the central bar 15 is removed, and the material delivered in larger quantity in a single stream directly upon the center of the traveling apron. When there is comparatively little of the waste material in the beans, the plates 17 and bars 13 and 15 may be entirely removed so that the material will be delivered directly from the hopper by the feed roller upon the upper stretch of the apron.

From the foregoing description, taken in connection with the accompanying drawing, the construction, manner of operation, and several advantages of my invention will be clearly and fully understood. The operator is enabled, by means of the machine, to effect a thorough separation of the worthless matter from the beans in a relatively short time and with comparatively little manual labor. While I have herein referred to the machine as being employed for the sorting or separation of beans, it is manifest that the invention may also be utilized for various other analogous purposes. It is further to be understood that while I have herein set forth the preferred construction and relative arrangement of the various elements employed, the same are, neverthless, susceptible of considerable modification and I, therefore, reserve the privilege of adopting all such legitimate changes as may be fairly embodied within the spirit and scope of the invention as claimed.

Having thus fully described my invention, what I desire to claim and secure by Letters Patent is:—

1. In a machine of the character described, an endless apron, means for feeding material to the upper stretch of the apron, said means including spaced bars, and an intermediate removable bar whereby the material may be fed to the apron in spaced, parallel lines when said bar is in position, or may be delivered at a single point centrally upon the apron when the bar is removed.

2. In a machine of the character described, an endless apron, a rotatable feed roller mounted above one end of the apron, means, including a removable bar, for delivering the material from the roller upon the upper stretch of the apron either in spaced, parallel lines when said bar is in position or at a single point centrally of the apron when the bar is removed, and means for synchronously operating the apron and feed roller.

3. In a machine of the character described, a movable apron, a feed hopper mounted above said apron, and a distributer removably mounted beneath the hopper and including a removable part whereby the material is delivered upon the apron at spaced points when said part is in position or at a single point upon the apron when said part is removed.

4. In a machine of the character described, an endless traveling apron, spaced parallel bars, inclined directing plates connected to said bars at their inner edges, means for removably supporting said bars and the directing means above the upper stretch of the apron, said plates delivering the material at a central position upon the upper stretch of the apron, and means for operating the apron.

5. In a machine of the character described, spaced parallel bars, a removable bar mounted above said spaced bars and in spaced relation to the latter bars, inclined directing plates connected to said bars at their inner edges, means for removably supporting said bars and the directing means above the upper stretch of the apron, said plates delivering the material between said bars in parallel lines upon the apron, and means for operating the apron.

In testimony whereof I hereunto affix my signature in the presence of two witnesses.

MERTON MERRIMAN.

Witnesses:
JAMES HOLLMAN,
E. S. CUTSFORTH.

Copies of this patent may be obtained for five cents each, by addressing the "Commissioner of Patents, Washington, D. C."